United States Patent
Morgeneyer et al.

(10) Patent No.: US 10,407,596 B2
(45) Date of Patent: Sep. 10, 2019

(54) UV-REACTIVE HOT-MELT ADHESIVE FOR LAMINATING TRANSPARENT FILMS

(71) Applicant: Henkel AG & Co. KGaA, Duesseldorf (DE)

(72) Inventors: Thomas Morgeneyer, Bopfingen (DE); Jürgen Lotz, Kiedrich (DE); Claudia Meckel-Jonas, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/257,129

(22) Filed: Sep. 6, 2016

(65) Prior Publication Data

US 2016/0376482 A1    Dec. 29, 2016

Related U.S. Application Data

(63) Continuation of application No. PCT/EP2015/054423, filed on Mar. 3, 2015.

(30) Foreign Application Priority Data

Mar. 11, 2014 (DE) ........................ 10 2014 204 465

(51) Int. Cl.
| | |
|---|---|
| *C09J 133/14* | (2006.01) |
| *C08G 18/48* | (2006.01) |
| *C08F 2/48* | (2006.01) |
| *C08G 18/67* | (2006.01) |
| *C08G 18/75* | (2006.01) |
| *C08G 18/40* | (2006.01) |
| *C08G 18/42* | (2006.01) |
| *C09J 175/16* | (2006.01) |
| *C09J 4/06* | (2006.01) |
| *B32B 37/12* | (2006.01) |
| *C08K 5/521* | (2006.01) |
| *C08L 23/08* | (2006.01) |
| *C08L 33/12* | (2006.01) |
| *C08K 5/00* | (2006.01) |
| *C08K 5/5397* | (2006.01) |

(52) U.S. Cl.
CPC ......... *C09J 133/14* (2013.01); *B32B 37/1207* (2013.01); *C08F 2/48* (2013.01); *C08G 18/4018* (2013.01); *C08G 18/4238* (2013.01); *C08G 18/4825* (2013.01); *C08G 18/672* (2013.01); *C08G 18/673* (2013.01); *C08G 18/675* (2013.01); *C08G 18/755* (2013.01); *C08K 5/521* (2013.01); *C08L 23/0869* (2013.01); *C08L 33/12* (2013.01); *C09J 4/06* (2013.01); *C09J 175/16* (2013.01); *B32B 2037/1215* (2013.01); *B32B 2310/0831* (2013.01); *B32B 2317/16* (2013.01); *B32B 2607/00* (2013.01); *C08G 2170/20* (2013.01); *C08K 5/0025* (2013.01); *C08K 5/5397* (2013.01)

(58) Field of Classification Search
CPC ....................................................... C09J 175/16
See application file for complete search history.

(56) References Cited

U.S. PATENT DOCUMENTS

| | | | | |
|---|---|---|---|---|
| 4,717,739 A | * | 1/1988 | Chevreux | ......... B32B 17/10706 156/99 |
| 4,873,023 A | * | 10/1989 | Schulz | .................. C08F 299/06 528/272 |
| 6,440,519 B1 | * | 8/2002 | Takase | .................. C08G 18/672 156/275.5 |
| 8,506,742 B2 | | 8/2013 | Terfloth et al. | |
| 2007/0179254 A1 | * | 8/2007 | Wang | .................. C08G 18/3206 525/440.072 |
| 2009/0082485 A1 | * | 3/2009 | Slark | ......................... C08F 2/48 522/153 |
| 2012/0172484 A1 | | 7/2012 | Kim et al. | |

(Continued)

FOREIGN PATENT DOCUMENTS

| | | |
|---|---|---|
| DE | 102006007869 A1 | 8/2007 |
| EP | 1860128 A1 | 11/2007 |
| WO | 9836325 A1 | 8/1998 |

(Continued)

OTHER PUBLICATIONS

Soken. Soken Chemical & Engineering Co., Ltd. Performance Materials. Available at: https://www.soken-ce.co.jp/en/product/performance_materials/actflow/. (Year: 2018).*

(Continued)

*Primary Examiner* — Michael M Dollinger
(74) *Attorney, Agent, or Firm* — James E. Piotrowski

(57) ABSTRACT

The present invention relates to a UV-curable hot-melt adhesive for laminating transparent films, in particular, on molded bodies made of wood materials that are coated with melamine or PVC. The hot-melt adhesives contain: at least one UV-curable urethane (meth)acrylate, wherein the urethane (meth)acrylate can be obtained by converting an NCO-functional polyurethane prepolymer with a molar excess of hydroxy and/or amine-modified (meth)acrylates; at least one (meth)acrylate monomer or oligomer, wherein the at least one (meth)acrylate monomer and/or oligomer comprises an acid-modified (meth)acrylate with an acid value of 50 to 400 mg KOH/g; and at least one photoinitiator. Other aspects of the present invention are methods for laminating a film onto a molded body using said hot-melt adhesives, and to the composite materials produced in this manner.

12 Claims, No Drawings

(56) References Cited

U.S. PATENT DOCUMENTS

2014/0238593 A1    8/2014   Morgeneyer et al.

FOREIGN PATENT DOCUMENTS

| WO | 2005105857 A1 | 11/2005 |
| WO | 2009077865 A2 | 6/2009 |
| WO | 2012014562 A1 | 2/2012 |
| WO | 2013068298 A1 | 5/2013 |

OTHER PUBLICATIONS

International Search Report for International PCT Patent Application No. PCT/EP2015/054423 dated May 19, 2015.

\* cited by examiner

UV-REACTIVE HOT-MELT ADHESIVE FOR LAMINATING TRANSPARENT FILMS

The present invention relates to a UV-curable hot-melt adhesive for laminating transparent films, in particular, on molded bodies made of wood materials that are coated with melamine or PVC. The hot-melt adhesives contain a UV-curable urethane acrylate, monomeric and/or oligomeric (meth)acrylates), at least one photoinitiator. Other aspects of the present invention are methods for laminating a film onto a molded body using said hot-melt adhesives, and to the composite materials produced in this manner.

In the manufacture of furniture parts with high-gloss surfaces, it is known to coat particle boards or MDF boards with up to ten different lacquer layers. However, so doing requires considerable technological expenditure for lacquering, drying, or UV-curing and intermediate sanding after each individual lacquering step. Due to the considerable expenditures required in such lacquering techniques, a variety of techniques have been developed in order to laminate high-gloss films onto appropriate carriers. The lamination entails the use of commercially-available moisture-crosslinking PUR hot-melt adhesives that release $CO_2$ when cured, which can adversely affect the surface quality. Similar issues arise with the use of commercially-available PUR hot-melt adhesives to coat a surface, and subsequent lacquering with UV lacquer. In addition, the manufactured furniture components cannot be further processed immediately after the lamination, because the reactive polyurethane adhesive is not yet cured.

WO 2009/077865 A2 discloses production and use of UV-curable hot-melt adhesives for surface finishing of wood-based panels. Herein, a UV-curable hot-melt adhesive is applied onto the panel, and cured together with a subsequently-applied UV lacquer. This system is disadvantageous in that the adhesion onto melamine panels or PVC coatings is limited.

The present invention therefore addresses the problem of developing, for wood materials with melamine panels or PVC coatings, a technical solution that is technically easy and makes it possible to laminate high-gloss films onto aforementioned surfaces in order to manufacture high-gloss furniture components by means of high-gloss films instead of by lacquering. The objective then is to provide a system that makes it possible to further process the manufactured furniture components immediately after the film lamination, and to forgo lacquering and intermediate sanding steps.

The inventors have surprisingly found that this problem can be solved by a UV-curable hot-melt adhesive composition that contains UV-curable urethane (meth)acrylates in combination with additional monomeric and/or oligomeric (meth)acrylates.

In a first aspect, the present invention therefore relates to a UV-curable hot-melt adhesive composition containing
a) at least one UV-curable urethane (meth)acrylate, wherein the urethane (meth)acrylate can be obtained by converting an NCO-functional polyurethane prepolymer with a molar excess of hydroxy and/or amine-modified (meth) acrylates;
b) at least one (meth)acrylate monomer or oligomer, wherein the at least one (meth)acrylate monomer and/or oligomer comprises an acid-modified (meth)acrylate with an acid value of 50 to 400 mg KOH/g, preferably 100 to 200 mg KOH/g; and
c) at least one photoinitiator.

In another aspect, the present invention relates to methods for laminating a film, in particular, a PMMA- and/or polyester-based film, onto a molded body, in particular, a molded body coated with melamine or PVC, the methods being characterized in that the UV-curable hot-melt adhesive composition described herein is applied onto a surface of the molded body, a surface of the film, or both and the molded body and the film are then adhered together.

In yet another aspect, the present invention also encompasses the composites made of a molded body, in particular, a molded body comprising a melamine or PVC coating, and a film adhered thereto and produced according to the method disclosed herein.

Finally, the invention also relates to the use of the UV-curable hot-melt adhesive composition as described herein to adhere a film to a molded body.

The molecular weights set forth in the present text refer to the weight-average molecular weight (Mw), unless otherwise indicated. All molecular weights mentioned are values obtainable by gel permeation chromatography (GPC) according to DIN 55672-1:2007-08, unless otherwise indicated.

The acid values set forth in the present text refer to values such as are obtainable by titration according to DIN EN ISO 660:2009-10, unless otherwise indicated.

The hydroxyl values set forth in the present text refer to values such as are obtainable by titration according to DIN 53240-2:2007-11, unless otherwise indicated.

The NCO contents set forth in the present text refer to values such as are obtainable by titration according to DIN EN ISO 1 1909:2007-05, unless otherwise indicated.

"At least one," as used herein, means one or more, i.e., one, two, three, four, five, six, seven, eight, nine, or more. References made to a component refer to the type of the component, and not to the absolute number of molecules. Thus, "at least one acrylate" means, for example, at least one type of acrylate, i.e., that one type of acrylate or a mixture of a plurality of different acrylates can be used. Together with references to weight, references designate all compounds of the relevant type that are contained in the composition/mixture, i.e., that the composition contains no further compounds beyond the given amount of corresponding compounds.

All percentages mentioned in connection with the compositions described herein refer to wt %, each with reference to the corresponding mixture, unless explicitly stated otherwise.

"About" or "approximately" as used herein in connection with a numerical value refer to the numerical value ±10%, preferably ±5%.

It has surprisingly been found that the hot-melt adhesives described herein: exhibit very favorable adhesion onto melamine and PVC surfaces, as well as PMMA- and/or polyester-based films; are UV-stable and yellowing-resistant; therefore make it possible to laminate transparent films, e.g., onto surfaces already provided with decoration; are chemically cured rapidly and completely under UV radiation; and the bonded composite materials can therefore be further processed directly after the lamination, which enables significantly shorter machine lengths, in particular, as compared to conventional lacquering methods, and in-line processes with high feed rates.

The isocyanate (NCO)-functional PU prepolymers, in particular, NCO-terminated PU prepolymers, are obtained by reacting a polyol or a polyol mixture with a stoichiometric excess of polyisocyanate. The polyols used in the preparation of the prepolymer may be any and all polyols commonly used for polyurethane synthesis, e.g., polyester polyols, polyether polyols, polyester ether polyols, polycarbonate polyols, or mixtures of two or more of the foregoing.

Polyether polyols can be produced from a large number of alcohols which contain one or more primary or secondary alcohol groups. As initiators for the production of the polyethers, the following compounds, for example, or mixtures of these compounds, may be used: water, ethylene glycol, propylene glycol, glycerol, butanediol, butanetriol, trimethylolethane, pentaerythritol, hexanediol, 3-hydroxyphenol, hexanetriol, trimethylolpropane, octanediol, neopentyl glycol, 1,4-hydroxymethylcyclohexane, bis(4-hydroxyphenyl) dimethylmethane, and sorbitol. Ethylene glycol, propylene glycol, glycerol, and trimethylolpropane are preferably used, particularly preferably ethylene glycol and propylene glycol, and in a particularly preferred exemplary embodiment, propylene glycol is used.

Suitable as cyclic ethers for the production of the polyethers described above are alkylene oxides, such as ethylene oxide, propylene oxide, butylene oxide, epichlorohydrin, styrene oxide, or tetrahydrofuran, or mixtures of these alkylene oxides. The use of propylene oxide, ethylene oxide or tetrahydrofuran or mixtures of these is preferred. Propylene oxide or ethylene oxide or mixtures of these are particularly preferably used. Propylene oxide is most particularly preferably used.

Polyester polyols may be produced, for example, by reacting low molecular weight alcohols, in particular ethylene glycol, diethylene glycol, neopentyl glycol, hexanediol, butanediol, propylene glycol, glycerol, or trimethylolpropane with caprolactone. Also suitable as polyfunctional alcohols for producing polyester polyols are 1,4-hydroxymethylcyclohexane, 1,3-methyl-2,1-propanediol, 2,4,4-butanetriol, triethylene glycol, tetraethylene glycol, polyethylene glycol, dipropylene glycol, polypropylene glycol, dibutylene glycol, and polybutylene glycol.

Other suitable polyester polyols can be produced by polycondensation. For instance, difunctional and/or trifunctional alcohols can be condensed with a substoichiometric quantity of dicarboxylic acids or tricarboxylic acids, mixtures of dicarboxylic acids or tricarboxylic acids, or reactive derivatives thereof, to form polyester polyols. Suitable dicarboxylic acids are, for example, adipic acid or succinic acid and higher homologues thereof with up to 16 C atoms, and also unsaturated dicarboxylic acids, such as maleic acid or fumaric acid, as well as aromatic dicarboxylic acids, in particular the isomeric phthalic acids, such as phthalic acid, isophthalic acid or terephthalic acid. Examples of suitable tricarboxylic acids include citric acid or trimellitic acid. The aforementioned acids can be used individually or as mixtures of two or more thereof. Particularly suitable alcohols are hexanediol, butanediol, ethylene glycol, diethylene glycol, neopentyl glycol, 3-hydroxy-2,2-dimethylpropyl 3-hydroxy-2,2-dimethylpropanoate, or trimethylolpropane, or mixtures of two or more thereof. Particularly suitable acids are phthalic acid, isophthalic acid, terephthalic acid, adipic acid, or dodecanedioic acid or mixtures thereof. Polyester polyols with high molecular weight include, for example, the reaction products of polyfunctional, preferably difunctional, alcohols (optionally together with small quantities of trifunctional alcohols) and polyfunctional, preferably difunctional, carboxylic acids. Instead of free polycarboxylic acids, (if possible) the corresponding polycarboxylic anhydrides or corresponding polycarboxylic acid esters with alcohols having preferably 1 to 3 C atoms can also be used. The polycarboxylic acids may be aliphatic, cycloaliphatic, aromatic, or heterocyclic, or both. They may optionally be substituted, for example by alkyl groups, alkenyl groups, ether groups, or halogens. Examples of suitable polycarboxylic acids include succinic acid, adipic acid, suberic acid, azelaic acid, sebacic acid, dodecanedioic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimer fatty acid, or timer fatty acid, or mixtures of two or more thereof.

Polyesters obtainable from lactones, for example based on ε-caprolactone, also known as "polycaprolactones," or hydroxycarboxylic acids, for example ω-hydroxycaproic acid, can also be used.

It is, however, also possible to use polyester polyols of oleochemical origin. Such polyester polyols may, for example, be produced by complete ring opening of epoxidized triglycerides of a fat mixture containing at least in part an olefinically unsaturated fatty acid with one or more alcohols having 1 to 12 C atoms and subsequent partial transesterification of the triglyceride derivatives to yield alkyl ester polyols having 1 to 12 C atoms in the alkyl residue.

Polycarbonate polyols may, for example, be obtained by the reaction of diols, such as propylene glycol, 1,4-butanediol or 1,6-hexanediol, diethylene glycol, triethylene glycol or tetraethylene glycol or mixtures of two or more of these diols with diaryl carbonates, for example diphenyl carbonates, or phosgene.

The molecular weight (Mw) of the polyols used to synthesize the prepolymer is preferably in the range of 320 to 20000 g/mol, in particular, 330 to 4500 g/mol. The nominal functionality may be in the range of 2 to 4.5. The PU prepolymer preferably has a polyether, polyester, or polyether/polyester backbone.

As a polyether polyol, in certain embodiments it is preferable to use polypropylene glycol, in particular, polypropylene glycol having a molecular weight (Mw) of about 2000 g/mol and/or a hydroxyl value of about 50 to 60 mg KOH/g.

In other embodiments, as a polyester polyol, it is preferable to use a copolyester based on 1,6-hexanediol and adipic acid or 1,6-hexanediol and 1,12-dodecanedioic acid, in particular, with a hydroxyl value of 25 to 35 mg KOH/g.

Especially preferred embodiments involve use, as a polyol, of mixtures of different polyols, in particular, mixtures of polyether polyols, in particular, polypropylene glycol and polyester polyols, in particular, the copolyesters described above. The mass ratio of polyether polyol to polyester polyol may be 25:1 to 1:1, in particular, 7:1 to 3:1 in such mixtures. In particular, polyether polyols, preferably polypropylene glycols are used in amounts of 20 to 70 wt %, especially preferably, 25 to 50 wt %, in relation to the composition of the prepolymer. The polyester polyols are preferably used in amounts of 0 to 15 wt %, preferably 2 to 10 wt %, also in relation to the composition of the prepolymer.

Further preferred embodiments involve use, as a polyol component, of the polyether and/or polyester polyols or mixtures thereof described above, in combination with hydroxy group- and/or carboxyl group-containing poly(meth)acrylate(s) and, in addition, at least one copolymer of ethylene with maleic anhydride or acrylic acid and/or at least one oxidized polyethylene wax. The poly(meth)acrylates then preferably have a hydroxyl value of less than 20 mg KOH/g, preferably 5 to 10 mg KOH/g, and an acid value of less than 10 mg KOH/g. The copolymers of ethylene with maleic anhydride or acrylic acid are, in particular, polyethylene waxes having 1 to 5 wt %, preferably 2 to 3 wt % maleic anhydride units and/or 5 to 20 wt % acrylic acid units, in relation to the copolymers. Such waxes are used in amounts of 0.5 to 8 wt %, in particular, 3 to 5 wt % in relation to the adhesive composition. The poly(meth)acrylates mentioned above are then used in amounts of 0 to 40 wt %, preferably 15 to 30 wt %, in relation to the composition of the prepolymer.

Available examples include Voranol™ 2000L (Dow Chemical) in terms of polyether polyols, Dynacoll™ 7380 or Dynacoll™ 7360 (Evonik) in terms of polyester polyols, and Elvacite 2013 (Lucite International, Inc.), Dynacoll AC 1420, Dynacoll AC 1520, Dynacoll AC 1620, Dynacoll AC 1630, Dynacoll AC 1920, or Dynacoll AC 2740 (Evonik) in terms of methyl methacrylate/butyl methacrylate copolymer. Available examples of PE waxes include Honeywell AC 575 P, AC 578 P, AC 5180, AC 5120, AC 540, and AC 645 P.

The stoichiometric excess of polyisocyanate is 1.25:1 to 2.5:1, preferably 1.5:1 to 2:1 in relation to the molar ratio of NCO groups to OH groups.

Any suitable compound having two or more isocyanate groups may be used as the polyisocyanate. Suitable polyisocyanates include (but are not limited to) alkylene diisocyanates, cycloalkylene diisocyanates, aromatic diisocyanates, and aliphatic/aromatic diisocyanates. Specific examples of suitable compounds include (but are not limited to) ethylene diisocyanate, ethylidene diisocyanate, propylene diisocyanate, butylene diisocyanate, trimethylene diisocyanate, hexamethylene diisocyanate (HDI), methylene bis-4(cyclohexyldiisocyanate) (HMDI), isophorone diisocyanate (IPDI), dichlorohexamethylene diisocyanate, furfurylidene diisocyanate, cyclopentylene-1,3-diisocyanate, cyclo-hexylene-1,4-diisocyanate, and cyclohexylene-1,2-diisocyanate. Also included are different isomers of toluene diisocyanate, such as, for example, 2,4-toluene diisocyanates, 2,6-toluene diisocyanates, and/or mixtures thereof, meta-xylene diisocyanate and para-xylene diisocyanate, 4,4'-diphenylmethane diisocyanate, 2,4'-diphenylmethane diisocyanate, 2,2-diphenylpropane-4,4'-diisocyanate, tetramethylxylene diisocyanate, 1,4-naphthyl diisocyanate, 1,5-naphthyl diisocyanate, m-phenyl diisocyanate, p-phenyl diisocyanate, diphenyl-4,4'-diisocyanate, azobenzene-4,4'-diisocyanate, diphenylsulfone-4,4'-diisocyanate, 1-chlorobenzene-2,4-diisocyanate, 4,4',4"-triisocyanatotriphenyl methane, 1,3,5-triisocyanatobenzen, 2,4,6-triisocyanatotoluene, 4,4'-dimethyldiphenyl methane-2,2',5,5'-tetraisocyanate, 4-chloro-1,3-phenyl diisocyanate, 1,5-tetrahydronaphthaline diisocyanate, 4,4'-dibenzyl diisocyanate, 1,2,4-benzene triisocyanate, and 1-methoxyphenyl-2,4-diisocyanate.

Suitable polymeric polyisocyanates include cycloaliphatic and/or aromatic polyisocyanates and/or polymethylene polyphenylene polyisocyanates (polymeric MDI). Also suitable are bifunctional prepolymers, i.e., prepolymers that have two isocyanate groups, made of polyester and diisocyanate, e.g., IPDI. Trimerizates may be used, for example, in proportions of 10% in relation to the NCO content of the isocyanates.

Preferred diisocyanates are methylene diphenyl diisocyanates (MDIs), such as 4,4'-methylene diphenyl diisocyanate, 2,4'-methylene diphenyl diisocyanate, or 2,2'-methylene diphenyl diisocyanate, isophorone diisocyanate (IPDI), and/or the trimer thereof, toluene diisocyanate (TDI) and/or trimers thereof, methylene-bis-(4-cyclohexyl diisocyanate) (HMDI), and/or hexamethylene diisocyanate (HDI) and/or trimers thereof, and/or tetramethylxylylene diisocyanate (TMXDI). Aliphatic diisocyanates such as HMDI, IPDI, and HDI are particularly preferred.

Available examples of polyisocyanates include Desmodur® I, Desmodur® 44MC, Desmodur® W, Desmodur® N3200, Desmodur® N3300 (Bayer), and/or Vestanat® T1890/100 (Evonik).

The at least one NCO-terminated PU prepolymer is thereof preferably an aliphatic isocyanate-terminated polyurethane prepolymer made of a polyether/polyester polyol mixture such as is defined above, and an aliphatic diisocyanate such as IPDI.

The polyols and polyisocyanates are reacted in methods well known in the prior art to make the NCO-terminated/-functional PU prepolymers, usually in the presence of a suitable catalyst, e.g., a tin-containing catalyst such as DBTL (dibutyltin dilaurate) in amounts of 0.01 to 0.5 wt %, in particular, 0.05 to 0.1 wt %, in relation to the reagents used.

The corresponding prepolymers typically have an NCO content of 0.5 to 5 wt %, and have a nominal average NCO functionality of 1 to 2.

The molecular weight (Mw) of the prepolymer is, in particular, in the range of 1500 to 30000 g/mol, particularly preferably from 5000 to 20,000 g/mol.

The NCO-functional PU prepolymer then, in the next step, is reacted with suitable (meth)acrylates, i.e., hydroxy- and/or amine-modified (meth)acrylates to make a urethane acrylate. A hydroxy- or amine-modified (meth)acrylate is to be understood in terms of the present application to mean "bearing hydroxy groups or amino groups." For this purpose, a molar excess of (meth)acrylates is used in order to convert all of the free NCO groups and thus generate a substantially isocyanate-free urethane acrylate having an NCO content of less than 0.1%.

Suitable hydroxy- and/or amine-modified (meth)acrylates include monomeric and/or oligomeric (meth)acrylates having an acrylate functionality of 1 to 6 and a hydroxy and/or amine functionality, preferably hydroxy functionality, of 1 to 4. Suitable compounds include (but are not limited to) propylene glycol acrylate, 2-hydroxyethyl acrylate, epoxy acrylates, in particular, bisphenol A epoxy diacrylate, aliphatic and aromatic urethane acrylates, optionally ethoxylated pentaerythritol tri- and/or tetraacrylate esters, dipentaerythritol penta- and/or hexaacrylate esters, and caprolactone acrylate. Mixtures of the foregoing can also be used. Suitable (meth)acrylates are available, for example, under the trade names Bisomer® PPA6, Bisomer® HEA (Geo Specialty), Ebecryl® 600, Ebecryl® 3700, Ebecryl® 8210, Ebecryl® 8254, Ebecryl® 8310, PETIA and DPHA (Allnex), or Urethan-Acrylat-00-22, Miramer® M340, Miramer® M600, Genomer® 2255, and Genomer® 2263 (Rahn).

The proportion of the aforementioned (meth)acrylates in the adhesive composition is, in particular, in the range of 2 to 20 wt %, preferably 2 to 15 wt %, even more preferably 5 to 10 or 4 to 8 wt %. The precise amount of (meth)acrylates is selected so that there is a significant excess of hydroxy and/or amine functionality, in particular, hydroxy functionality, relative to the isocyanate functionality existing after the first reaction step. Preferably, the hydroxyl value of the urethane acrylate is in the range of 1 to 50 mg KOH/g, particularly preferably 1 to 8 mg KOH/g.

The molecular weight (Mw) of the urethane acrylate is in the range of more than 2000 g/mol, in particular, 5000 to 30000 g/mol. The polydispersity is preferably in the range of 5 to 15.

After the reaction with the hydroxy- and/or amine-modified (meth)acrylates, the urethane acrylate polymer preferably has an acrylate functionality of 2 to 6.

A hot-melt adhesive or hot-melt adhesive composition according to the present invention further includes at least one (meth)acrylate monomer or oligomer comprising at least one acid-modified (meth)acrylate with an acid value of 50 to 400 mg KOH/g, preferably 100 to 200 mg KOH/g. An acid-modified (meth)acrylate is to be understood in terms of the present application to mean a (meth)acrylate monomer or oligomer having an acid value of at least 20 mg KOH/g. The (meth)acrylate monomers or oligomers are preferably mixtures of different (meth)acrylates, and may comprise monomeric and/or oligomeric components. Preferably, such mixtures comprise both monomeric and oligomeric components.

Oligomeric components preferably have a molecular weight (Mw) of 500 to 5000 g/mol, and bear at least two acrylate or methacrylate groups, preferably 2 to 6 acrylate or methacrylate groups. This may entail known urethane acrylates, polyester acrylates, epoxy acrylates, melamine acrylates, and so forth, or mixtures thereof. Epoxy acrylates or polyester acrylates are particularly preferred. Such oligomeric components are commercially available. Preferably, these have a high functionality and contain, for example, more than two unsaturated groups.

The hot-melt adhesive according to the present invention may also contain monomeric components that have only one unsaturated acrylate/methacrylate group. This have a molecular weight (Mw) of 100 to 1000 g/mol. This may entail known mono(meth)acrylate derivatives, for example, esters of (meth)acrylic acid having monohydric alcohols. Esters having aliphatic alcohols that bear yet another OH group in the alkyl moiety are also suitable. Particularly suitable are reaction products based on polyether polyols with (meth)acrylic acids having a molecular weight (Mw) of 200 to 1000 g/mol.

In further embodiments, the at least one (meth)acrylate monomer or oligomer is a mixture of monomeric and/or oligomeric (meth)acrylates, in particular, a mixture of monomeric and oligomeric (meth)acrylates containing the at least one acid-modified (meth)acrylate with an acid number of 50 to 400 mg KOH/g, preferably, 100 to 200 mg KOH/g, in an amount of 5 to 40 wt %, preferably 9 to 22 wt %, each in relation to the total mass of monomeric and/or oligomeric (meth)acrylates. The (meth)acrylates contained in these mixtures of monomeric and/or oligomeric (meth)acrylates may, for example, be selected from polyester acrylates, propoxylated neopentyl glycol diacrylate, 2-(2-ethoxyethoxy)ethyl acrylate, and tetrahydrofurfuryl acrylate.

Suitable polyester acrylates are available, for example, under the names Sartomer® CN704, Sartomer® CN2610, Sartomer®203 (Arkema), Genomer® 361 1 or 03-849 (Rahn), Ebecryl® 837, Ebecryl® 892, and Ebecryl® 812 (Allnex).

Propoxylated neopentyl glycol diacrylate is available, for example, under the names Sartomer® SR9003 (Arkema), Photomer® 4127 (IGM Resins), or Miramer® M216 (Rahn).

2-(2-Ethoxyethoxy)ethyl acrylate is available, for example, under the names Sartomer® SR256 (Arkema) or Neopol® 8351 (Japan U-Pica).

Tetrahydrofurfuryl acrylate is available, for example, under the names Sartomer® SR285 (Arkema) or Viscoat® 150 (Osaka Organic Chemical).

Acid-modified (meth)acrylates, as described herein, are available, for example, under the names Sartomer® SR9051, Sartomer® SR9054 (Arkema), Ebecryl® E 171 (Allnex), Genorad® 40 (Rahn), Laromer® PA9039, or Laromer® PA9083 (BASF SE).

The proportion of these monomeric/oligomeric (meth)acrylates in the formulation is, in particular, 15 to 45 wt %, preferably 25 to 35 wt %, each in relation to the hot-melt adhesive composition.

The hot-melt adhesive composition described herein further contains at least one photoinitiator, in particular, a UV initiator. 0.02 to 5 wt % of at least one photoinitiator may then be added. In the preferred case of irradiation with UV radiation, at least one photoinitiator is included in the composition according to the present invention in the amount of 0.1 to 3 wt %. Essentially all conventionally photoinitiators that are compatible with the coating agent according to the present invention, i.e., result in largely homogeneous mixtures are suitable within the framework of the present invention. Both photofragmenting initiators and cationic initiators can be used. Preferred initiators have absorption spectra that are suitable for the emission spectra of the UV radiator used, and the transmission spectra of the adhered films. It is particularly preferable to use mixtures of two or more photoinitiators. Suitable examples of initiators are those available under the name Irgacure® (BASF), in particular, Irgacure® 184 and 819; however, the types TPO, MBF, 127, 907, and 1173 may be used alone or in combination.

In various embodiments, the composition contains, in relation to the total composition,
a) 50 to 85 wt %, in particular, 55 to 75 wt % the at least one UV-curable urethane (meth)acrylate;
b) 15 to 45 wt %, in particular, 25 to 35 wt % the at least one (meth)acrylate monomer or oligomer; and
c) 0.02 to 5 wt %, in particular, 0.1 to 3 wt % the at least one photoinitiator.

In preferred embodiments, the components set forth then produce 100 wt %.

A hot-melt adhesive according to the present invention may, however, also contain still other additives. These are, for example, waxes, resins, adhesion promoters, stabilizers, antioxidants, flow promoters, fillers, wetting agents, deaerators, dyes, pigments, plasticizers, or other known adjuvants. If such additives are included, they are included in addition to the components set forth above, and the amounts set forth in wt % in relation to the composition are to be correspondingly adapted.

Added resins act to provide additional tackiness and improve the compatibility of the components. Such resins are used in an amount of 0 to 40 wt %, preferably up to 20 wt % in relation to the total composition. Waxes may optionally be added to the adhesive. The amount may be 0 to 20 wt %, in particular, 0 to 10 wt %, in relation to the total composition. The wax may be of natural, chemically modified, or synthetic origin. Plasticizers may also be included. The amount may be up to 20 wt %, in particular, 0 to 10 wt %, in relation to the total composition. Suitable plasticizers are oils, esters of carboxylic acids, or hydrocarbons.

Nonreactive, finely particulate inorganic minerals are suitable as fillers and/or pigments; these can be ground, precipitated, and/or surface-treated. Examples are chalk, coated chalk, lime powder, calcium magnesium carbonates, aluminum oxides and hydroxides, silicic acid, quartz, titanium dioxide, barium sulfate, sodium silicates or aluminum silicates, zeolites, bentonites, glass, and ground minerals, provided they are present as powders. The particle size is to be between 1 and 200 µm, in particular between 3 and 50 µm. Nanoscale fillers, for example based on $SiO_2$ or $TiO_2$, can also be employed. The selection and quantity are to be such that the necessary radiation-induced reaction is not impaired. The amount of pigments is to be from 10 to 50 wt % of the composition, in particular, 20 to 40 wt %. Transparent fillers are particularly suitable here, for example quartz, feldspar, or nepheline-containing minerals; the radiation sensitivity of the initiator can also be adjusted to the filler.

Included among the stabilizers, in particular UV stabilizers, or antioxidants usable as additives in the context of the invention are phosphites, phenols, high-molecular-weight sterically hindered phenols, polyfunctional phenols, sulfur- and phosphorus-containing phenols, or amines.

Suitable adhesion promoters are, in particular, silanized adhesion promoters, which can be used, for example, in amounts of 0.1 to 3, preferably 0.4 to 1 wt % in relation to the total composition. Suitable compounds include (but are not limited to) mercaptopropyl trimethoxysilane, glycidoxypropyl trimethoxysilane, or aminoethyl-3-aminopropyl trimethoxysilane.

Further nonreactive thermoplastic polymers can also be added, in small amounts up to a maximum of 10 wt %, to the hot-melt adhesive according to the present invention. These further polymers can influence properties of the adhesive, such as cohesion, viscosity, adhesion, and elasticity. These can be polymers known to a person skilled in the art, such as polyacrylates or nonreactive polyolefins and copolymers.

A particularly suitable adhesive composition contains 60 to 85 urethane acrylate, 15 to 40 wt % (meth)acrylate oligomers and/or monomers, 0.1 to 20 wt % additives, in particular, photoinitiators, and 0 to 40 wt % fillers/pigments. The sum of the components should then give 100 wt %.

The aforementioned particularly suitable raw materials can be selected individually or together. Particularly suitable photoinitiators and other aforementioned additives are those disclosed and described as such in WO 2009/077865 A1.

A hot-melt adhesive according to the present invention can be produced by known methods from the aforementioned components. The components are preferably selected so that the adhesive has a viscosity from 1,000 to 20,000 mPas at a temperature of 130° C., in particular from 2,000 to 10,000 mPas at 80 to 120° C. Both here and hereinafter, the viscosity is that which is determined with a Physica Rheolab MC 1 viscometer, specifically using a plate/plate arrangement with a 0.2 mm gap and a shear rate of 20 $s^{-1}$.

Another aspect of the present invention relates to use of such hot-melt adhesives to adhere a flexible substrate such as, for example, a film, in particular, a transparent film to a solid substrate, in particular, a molded body. The hot-melt adhesive may then be applied to one or more surfaces of the substrate or the film that is to be adhered. It is necessary for the hot-melt adhesive to be brought to a suitable viscosity by melting. The application may occur, for example, by extrusion through a (slit) nozzle, by roller application, or by blading. The adhesive layer is selected so as to obtain a layer thickness preferably of 20 to 200 μm.

After application it is optionally also possible for the applied layer to be additionally smoothed. Directly after application, the surfaces to be adhered are brought into contact, for example, by being pressed together, and the layer is crosslinked by irradiation. This can be done using apparatuses known per se; UV radiation is particularly suitable. Irradiation is to be carried out for a period from 0.3 seconds to 15 seconds, in particular up to 10 seconds. The quantity of irradiation also depends on the intensity of the radiator and the distance thereof from the layer to be crosslinked. Crosslinking with UV radiation is preferred in the context of this invention. Irradiation of the coating agent according to the present invention with UV radiation takes place, in particular, at a wavelength in the range of 200 nm to 450 nm. The UV radiation is generated using known apparatuses. UV-LED radiators that generate a monochromatic UV radiation are particularly suitable. A high radiation density and good crosslinking at the bottom of the layer can thereby be ensured.

After crosslinking of the coating agent layer, the resulting composite made of the film and substrate may be directly machined, for example, by being sawed or milled.

The solid substrate may be, for example, a molded body made of wood material or plastics, in particular, those that are coated with melamine or PVC. The molded body, which may be, for example, a furniture part, may have a surface decoration that remains visible through the laminated transparent film. The film may be a high-gloss film, and may be composed of known materials, e.g., PMMA, PMMA/ABS, polyesters, or mixtures thereof.

The use of a rapidly crosslinking UV-curable hot-melt adhesive raises the processing speed, because long storage times are not needed to complete the known reactions. In-line coating and bonding of the substrates are possible. Favorable adhesion is also exhibited, in particular, on melamine- and PVC-containing surfaces; moreover, delamination between the adhesive layer and the bonded substrates due to moisture is not observed even during storage or loading.

The present invention also relates to methods for laminating a flexible substrate such as, for example, a film, in particular, a (transparent) PMMA- and/or polyester-based film onto a (solid) molded body, in particular, a molded body coated with melamine or PVC, wherein the UV-curable hot-melt adhesive composition described herein is applied to a surface of the molded body, a surface of the film, or both, and the molded body and the film are then bonded together. Therein, the application and bonding may, also already stated above, be performed in combination with the use according to the present invention.

The present invention further encompasses the composites that are or can be produced through these methods.

All of the embodiments disclosed herein in relation to the hot-melt adhesive can also be applied to the uses and methods described herein, and vice versa.

The present invention shall be described in greater detail below, with reference to several exemplary embodiments. The quantities set forth are wt %, unless otherwise stated.

EXAMPLES

Comparative Example 20 g of Voranol 2000L (polypropylene glycol), 5 g of Dynacoll 7360 (polyester polyol), 13 g of Elvacite 2013 (methyl methacrylate/butylmethacrylate copolymer), and 1 g of Irganox 1010 (antioxidant) were weighed in a glass reactor, and slowly heated under stirring and in a vacuum to 130° C. to 140° C., until the methacrylate copolymer had dissolved into the polypropylene glycol. Then, 0.1 g of phosphoric acid and 5.5 g of IPDI (Desmodur I from Bayer) were added and mixed in. The product was tempered to 100° C. to 110° C., and then 0.5 g of the catalyst BDTL was metered. The reaction time under a protective gas atmosphere was 60 to 120 minutes, following which the prepolymer had an NCO content of 2.4% and a viscosity of 10,000 mPas at 110° C.

In the next step, at a reaction temperature of about 110° C., the hydroxy-functionalized acrylates were added: first 4 g of Bisomer PPA6, followed by 4 g of Ebecryl 3700 and then 12 g of Sartomer SR444 and 4 g of DPHA. The NCO content fell to 0% by about 30 minutes after the last addition of acrylate. Next, the UV initiators Irgacure 184 and Irgacure 819 (BASF) were mixed in, in quantities of 0.75 g each, together with 2 g of the acrylate stabilizer Irgastab UV22 (BASF).

The resulting hot-melt adhesive had a melt viscosity of 15,000 mPas at 110° C., an elongation at break of 10%, and a tensile strength of about 12 mPa according to DIN EN 527, as measured 24 hours after curing. The Shore hardness D was about 65 (DIN ISO 7619-1:2012-02).

When this adhesive was applied and cured on a melamine surface, the "Tesa test" (DIN EN ISO 2409) resulted in detachment of the adhesive film from the melamine surface (cross-hatch adhesion value GT 4-5).

Example 1

According to the Present Invention 90 g of Voranol 2000L (polypropylene glycol), 15 g of Dynacoll 7360 (polyester polyol), 45 g of Elvacite 2013 (methyl methacrylate/butylmethacrylate copolymer), and 4 g of Irganox 1010 (antioxidant) were weighed in a glass reactor, and slowly heated under stirring and in a vacuum to 130° C. to 140° C., until the methacrylate copolymer had dissolved into the polypropylene glycol. Then, 10 g of AC540 and 10 g of AC578 (modified PE waxes; Honeywell) were added and homogenized. Next, 0.5 g of phosphoric acid and 19 g of IPDI (Desmodur I from Bayer) were added and mixed in. The product was tempered to 100° C. to 110° C., and then 2 g of the catalyst BDTL was metered. The reaction time under a protective gas atmosphere was 60 to 120 minutes, following which the prepolymer had an NCO content of 1.4% and a viscosity of 16,000 mPas at 110° C.

In the next step, at a reaction temperature of about 110° C., the hydroxy-functionalized acrylates were added: first 5 g of Bisomer PPA6, followed by 5 g of Ebecryl 3700 and then 20 g of PETIA from Allnex. The NCO content fell to 0% by about 30 minutes after the last addition of acrylate. Then, the following acrylates were added in a stepwise manner at a bulk temperature of 100° C.: 25 g of Sartomer CN704, 35 g of Ebecryl 812, 40 g of Photomer 4127, 10 g of Sartomer SR256, 15 g of Viscoat 150, and 20 g of Ebecryl E 171. Next, the UV initiators Irgacure 184 and Irgacure 819 (BASF) were mixed in, in quantities of 2 g each, together with 2 g of the acrylate stabilizer Irgastab UV22 (BASF) and 2 g, each, of the silanes Silquest A187 and A189 (Momentive Performance Materials).

The resulting hot-melt adhesive had a melt viscosity of 5,000 mPas at 110° C., an elongation at break of 100%, and a tensile strength of about 6 mPa according to DIN EN 527, as measured 24 hours after curing. The Shore hardness D was about 45.

When this adhesive was applied and cured on a melamine surface, the "Tesa test" (DIN EN ISO 2409) resulted in no detachment of the adhesive film from the melamine surface (cross-hatch adhesion value GT 0-1).

Example 2

Application

The hot-melt adhesive according to the present invention as in Example 1 was applied onto a transparent film (Senosan ABS/PMMA high-gloss Acryl AM 1800 TopX) by means of a nozzle at 100° C. The amount applied was 30 g/m². At the same temperature, the film was then pressed against the melamine-coated plate with a line pressure of 50 N/mm. The pressure roller and the melamine plate had the same temperature at this time. The feed rate was 8 m/min. The coating was immediately followed by irradiation with a UV radiator (Ga-doped mercury vapor lamp) with a capacity of about 100 W/cm, during which time the feed rate was maintained.

The invention claimed is:

1. A UV-curable hot-melt adhesive composition, comprising:
   (a) at least one UV-curable urethane (meth)acrylate, wherein the urethane (meth)acrylate is obtained by converting an NCO-functional polyurethane prepolymer with a molar excess of hydroxy and/or amine-modified (meth)acrylates,
      wherein the NCO-functional polyurethane prepolymer is obtained by reacting
      at least one polyether polyol, at least one polyester polyol, or a mixture thereof, a hydroxy group- and/or carboxyl group-containing (meth)acrylate, and, in addition, a copolymer of polyethylene with maleic anhydride or acrylic acid and/or an oxidized polyethylene wax, with
      a stoichiometric excess of at least one polyisocyanate;
   (b) at least one (meth)acrylate monomer or oligomer, wherein the at least one (meth)acrylate monomer or oligomer comprises an acid-modified (meth)acrylate with an acid value of 50 to 400 mg KOH/g; and
   (c) at least one photoinitiator.

2. The UV-curable hot-melt adhesive composition according to claim 1, wherein, each in relation to the total composition, the composition contains:
   (a) 50 to 85 wt % of the at least one UV-curable urethane (meth)acrylate;
   (b) 15 to 45 wt % of the at least one (meth)acrylate monomer or oligomer; and
   (c) 0.02 to 5 wt % of the at least one photoinitiator.

3. The UV-curable hot-melt adhesive composition according to claim 1, wherein:
   (a) the polyether polyol is a polypropylene glycol having a molecular weight Mw of about 2000 g/mol, and a hydroxyl value of about 50 to 60 mg KOH/g;
   (b) the polyester polyol is a copolyester based on 1,6-hexanediol and adipic acid or 1,12-dodecanedioic acid with a hydroxyl value of 25 to 35 mg KOH/g;
   (c) the hydroxy group- or carboxyl group-containing (meth)acrylate is a hydroxy-modified methylmethacrylate/butylmethacrylate copolymer;
   (d) the copolymer of ethylene with maleic anhydride or acrylic acid is a polyethylene wax having 1 to 5 wt % maleic anhydride units and/or 5 to 20 wt % acrylic acid units, in relation to the copolymer;
   (e) the at least one polyisocyanate is selected from diisocyanates, polymeric isocyanates, and bifunctional prepolymers of polyester and diisocyanates; and
   (f) the stoichiometric excess of polyisocyanate is 1.25:1 to 2.5:1 in relation to the molar ratio of NCO groups to OH groups.

4. The UV-curable hot-melt adhesive composition according to claim 1, wherein the hydroxy group- and/or amine-modified (meth)acrylates used to produce the at least one UV-curable urethane acrylate are monomeric and/or oligomeric (meth)acrylates having an acrylate functionality of 1 to 6 and hydroxy and/or amine functionality of 1 to 4, selected from propylene glycol acrylate, 2-hydroxyethyl acrylate, epoxy acrylates, Bisphenol A epoxy diacrylate, aliphatic and aromatic urethane acrylates, ethoxylated pentaerythritol tri- and/or tetraacrylate esters, dipentaerythritol penta- and/or hexaacrylate esters, and caprolactone acrylate.

5. The UV-curable hot-melt adhesive composition according to claim 1, wherein the at least one UV-curable urethane acrylate has a molecular weight Mw in the range of 5000 to 30000 g/mol, and/or has a hydroxyl value in the range of 1 to 50 mg KOH/g.

6. The UV-curable hot-melt adhesive composition according to claim 1, wherein the composition further contains one or more compounds selected from the group consisting of waxes, resins, adhesion promoters, stabilizers, antioxidants, flow promoters, fillers, wetting agents, deaerators, dyes, pigments, and plasticizers.

7. A method for laminating a film onto a molded body, comprising:
applying the UV-curable hot-melt adhesive composition according to claim 1 onto a surface of the molded body, a surface of the film, or both; and
adhering the molded body and the film together.

8. A composite made of a molded body and a film adhered thereto and produced according to the method of claim 7.

9. The UV-curable hot-melt adhesive composition according to claim 1, wherein, the at least one (meth)acrylate monomer or oligomer comprises a (meth)acrylate oligomer with a molecular weight (Mw) of 500 to 5000.

10. The UV-curable hot-melt adhesive composition according to claim 1, wherein, the at least one (meth)acrylate monomer or oligomer comprises a mixture of monomeric and oligomeric (meth)acrylates containing the at least one acid modified (meth)acrylate oligomer with an acid value of 50 to 400 mg KOH/g.

11. A UV-curable hot-melt adhesive composition, comprising:
at least one UV-curable urethane (meth)acrylate, wherein the urethane (meth)acrylate is obtained by converting an NCO-functional polyurethane prepolymer with a molar excess of hydroxy and/or amine-modified (meth)acrylates;
at least one (meth)acrylate monomer or oligomer, wherein the at least one (meth)acrylate monomer or oligomer comprises an acid-modified (meth)acrylate with an acid value of 50 to 400 mg KOH/g;
a mixture of monomeric and oligomeric (meth)acrylates selected from selected from polyester acrylate, propoxylated neopentyl glycol diacrylate, 2-(2-ethoxyethoxy)ethyl acrylate, tetrahydrofurfuryl acrylate, and mixtures thereof; and
at least one photoinitiator.

12. A UV-curable hot-melt adhesive composition, comprising:
at least one UV-curable urethane (meth)acrylate, wherein the urethane (meth)acrylate is obtained by converting an NCO-functional polyurethane prepolymer with a molar excess of hydroxy and/or amine-modified (meth)acrylates;
at least one (meth)acrylate monomer or oligomer, wherein the at least one (meth)acrylate monomer or oligomer is wherein the at least one (meth)acrylate monomer or oligomer comprises a mixture of monomeric and/or oligomeric (meth)acrylates that contains the at least one acid-modified (meth)acrylate with an acid value of 50 to 400 mg KOH/g, in an amount of 5 to 40 wt %, each in relation to the total mass of monomeric and/or oligomeric (meth)acrylates and the mixture of monomeric and/or oligomeric (meth)acrylates further contains one or more (meth)acrylates selected from polyester acrylates, propoxylated neopentyl glycol diacrylate, 2-(2-ethoxyethoxy)ethyl acrylate, and tetrahydrofurfuryl acrylate; and
at least one photoinitiator.

* * * * *

UNITED STATES PATENT AND TRADEMARK OFFICE
CERTIFICATE OF CORRECTION

PATENT NO. : 10,407,596 B2  
APPLICATION NO. : 15/257129  
DATED : September 10, 2019  
INVENTOR(S) : Thomas Morgeneyer, Jurgen Lotz and Claudia Meckel-Jonas Page 1 of 1

It is certified that error appears in the above-identified patent and that said Letters Patent is hereby corrected as shown below:

In the Specification

Column 4, Line 9: Change "timer" to -- trimer --.

Signed and Sealed this
Seventeenth Day of March, 2020

Andrei Iancu
*Director of the United States Patent and Trademark Office*